US 6,573,683 B2

(12) United States Patent
Chang

(10) Patent No.: US 6,573,683 B2
(45) Date of Patent: Jun. 3, 2003

(54) SWIVEL-JOINTED VOLTAGE-STEPPING AUTOMOBILE CHARGER

(75) Inventor: Rong-Chun Chang, Taipei (TW)

(73) Assignee: Wan Jiun Hsing Enterprises Co., Ltd., Taipei (TW)

( * ) Notice: Subject to any disclaimer, the term of this patent is extended or adjusted under 35 U.S.C. 154(b) by 0 days.

(21) Appl. No.: 10/219,991

(22) Filed: Aug. 14, 2002

(65) Prior Publication Data

US 2003/0034756 A1 Feb. 20, 2003

(30) Foreign Application Priority Data

Aug. 15, 2001 (TW) .......................................... 90213937

(51) Int. Cl.⁷ ................................................. H02J 7/00
(52) U.S. Cl. ....................................... 320/107; 320/113
(58) Field of Search ................................ 320/107, 113, 320/109; 429/99, 100

(56) References Cited

U.S. PATENT DOCUMENTS 6,246,765 B1 * 6/2001 Palett et al. ................ 379/454

* cited by examiner

Primary Examiner—Michael Sherry
Assistant Examiner—Lawrence Luk
(74) Attorney, Agent, or Firm—J. C. Patents

(57) ABSTRACT

A swivel-jointed voltage-stepping charger comprising a flexible hose, a transformer, a power socket/signal input-output port, an engaging bracket, a supporting frame and two charging stands. The flexible hose is a cylindrical tube that can be bent into a variety of final configurations. The transformer is connected to one end of the flexible hose. The power socket/signal input-output port has a plurality of connection terminals therein and is connected to the other end of the flexible hose away from the transformer. The engaging bracket joins up with the power socket/signal input-output port and the flexible hose. The supporting frame is firmly attached to the engaging bracket. Each charging stand has a signaling port and a ball-in-socket joint installed on the front and back surface of each charging stand. The two ball-in-socket joints are each fastened to a linkage sheath and a linking rod.

15 Claims, 5 Drawing Sheets

SWIVEL-JOINTED VOLTAGE-STEPPING AUTOMOBILE CHARGER

CROSS-REFERENCE TO RELATED APPLICATION

This application claims the priority benefit of Taiwan application serial no. 90213937, filed Aug. 15, 2001.

BACKGROUND OF THE INVENTION

1. Field of Invention

The present invention relates to an automobile charger. More particularly, the present invention relates to a multiple function swivel-jointed voltage-stepping automobile (SVA) charger.

2. Description of Related Art

Aside from the mobile phone, many other types of consumer electronic products, such as the portable personal digital assistants (PDA), are becoming popular in this information era. One major issue for all these hand held or portable devices is their power source. Although manufacturers have invented many types of long-lasting batteries to extend the standby time of the mobile phone or the running time of a PDA, there is always a limit to the amount of stored energy inside one pack of batteries. Once all the power inside the battery is drained, the battery must be charged to replenish the lost power.

An automobile charger can be used for re-charging the batteries of a mobile phone and PDA while a person is driving an automobile. In general, most automobile chargers include a fixed frame and a power signaling cable. The power signaling cable has two ends. One end contains the power plug and the other end contains a signaling plug. The signaling plug is connected to a mobile phone or a PDA while the power plug is plugged into a cigarette lighter socket inside an automobile.

Since the majority of automobiles have only a single cigarette lighter outlet, the automobile charger can provide, power to only one type of electronic product such as a mobile phone or a PDA at any one time.

FIG. 1 is a perspective view of a conventional automobile charger. As shown in FIG. 1, the automobile charger includes at least a fixed frame and a power signaling cable. The fixed frame further includes a support stand 114, a backing board 116 and a pair of clamps 118. The power signaling cable further includes a power plug 110 and a signaling plug 112. The backing board 116 is a roughly rectangular plate. The clamps 118 are attached to the side on the opposite edges of the backing board 116 respectively. The support stand 114 has a long rod with one end fastened to the backing board 116 and the other end fixed somewhere inside the automobile. A mobile phone or PDA is usually placed on the backing board 116 with the two clamps 118 acting as guides. To charge up the mobile phone or the PDA, the signaling plug 112 is plugged into the power port of the mobile phone or PDA and the power plug 110 is plugged into the cigarette lighter socket of the automobile.

However, this type of automobile charger is a little inconvenient because most automobiles have only one cigarette lighter. Despite the need to charge a number of portable electronic units, a conventional charger permits the charging of only one portable electronic unit at one time.

SUMMARY OF THE INVENTION

Accordingly, one object of the present invention is to provide a multiple function swivel-jointed voltage-stepping automobile (SVA) charger having a transformer for providing a voltage to a power connection socket and a signal connection input/output port each having a plurality of connection terminals. Thus, various portable electronic products may be charged at the same time.

To achieve these and other advantages and in accordance with the purpose of the invention, as, embodied and broadly described herein, the invention provides a multiple function swivel-jointed voltage-stepping automobile (SVA) charger. The SVA charger comprises a flexible hose, a transformer, a power socket/signal input-output port, an engaging bracket, a support frame and a pair of charging stands. The flexible hose is a long piece of flexible tube that can be bent but remains firm when left on its own. The transformer has the capacity to transform an input voltage. One end of the transformer is a rectangular body connected to one end of the flexible hose. The other end of the transformer has a cylindrical body suitable for plugging into the cigarette lighter of an automobile. Through a bearing bending design at the rectangular end and the cylindrical end of the transformer, the two ends of the transformer are free to rotate or bend. The transformer further includes a switch for switching to a multiple of voltages. The power socket/signal input-output port has a semi-circular cylindrical shape with a plurality of connection terminals such as audio-visual connection terminals capable of linking with the signaling terminals of electronic products selectively. The engaging bracket joins up with the power socket/signal input-output port at one end and the flexible hose at the other end. The support frame connects with the two charging stands through a ball-in-socket joint adjacent to the power socket/signal input-output port. Each charging stand has a signal connecting port such as a universal serial bus (USB), an RS-232, a mobile phone signal connecting port and a ball-in-socket joint. A ball-in-socket joint is attached to the front and back surfaces of each charging stand respectively so that each ball-in-socket joint is free to rotate relative to the charging stand. Furthermore, one ball-in-socket joint is attached to a linkage sheath while the other ball-in-socket joint is attached to one end of a linking rod having no linkage sheath.

The swivel-jointed voltage-stepping automobile charger of this invention further includes a plurality of wires inside the flexible hose for connecting the transformer with the power socket/signal input-output port.

The swivel-jointed voltage-stepping automobile charger may further include a pair of clamping fixtures such as a pair of single-sided automatic ejection/latch-back clamps or a pair of double-sided automatic ejection/latch-back clamps each attached to one of the charging stands on the same plane as the signal connection port. Alternatively, each clamping fixture includes a pair of clamping boards, a screw rod and a cap nut. Each clamping board has a through hole. One end of the screw rod has a T-shaped profile. The other end of the screw rod passes the through holes of the two clamping boards and joins up with the cap nut. The inner surface of each clamping board has an anti-slip layer such as a layer of polyurethane foam.

The supporting frame of the swivel-jointed voltage-stepping automobile charger further includes a rod support base, a supporting rod, two linking rods and a linkage sheath. The rod support base has a rectangular body fastened to the engaging bracket and adjacent to the power connection socket. The supporting rod has a cylindrical shape with one end perpendicularly attached to the rod support base and the other end having a spherical shape. The linking rods have a fine circular shape. One end of each linking rod is attached to the spherical end of the supporting rod and the linking rod is free to rotate relative to the supporting rod. The linkage sheath, is a cylindrical tube with a fine internal bore that encloses the linking rod and permits the linking rod to slide inside the cylindrical tube in the rod's axial direction. In addition, the supporting frame, the two linking rods and the linkage sheath may also be fabricated using flexible hose so that they can be bent into different configurations and yet remain firm in the last position after the bending force is removed.

The connecting terminals of the power socket/signal input-output port in the swivel-jointed voltage-stepping automobile charger support connections to a G-Mouse antenna through a signal connection port such as the USB or RS232 so that global positioning data can be signaled to a PDA.

This invention also provides a second swivel-jointed voltage-stepping automobile (SVA) charger. The SVA charger comprises a flexible hose, a transformer, two power slots, a power socket/signal input-output port, an engaging bracket, a support frame and a pair of charging stands. The flexible hose is a long piece of flexible tube that can be bent but remains firm when left on its own. The transformer has the capacity to transform an input voltage. One end of the transformer is a rectangular body connected to one end of the flexible hose. The other end of the transformer has a cylindrical body suitable for plugging into the cigarette lighter of an automobile. Through a bearing bending design at the rectangular end and the cylindrical end of the transformer, the two ends of the transformer are free to rotate or bend. The transformer further includes a switch for switching to a multiple of voltages. The two power slots have a rectangular body attached to the respective sides of the rectangular end of the transformer. Each power slot has a roughly circular internal groove. The power socket/signal input-output port has a columnar body with a plurality of connection terminals such as audio-visual connection terminals capable of linking with the signaling terminals of electronic products selectively. The engaging bracket joins up with the power socket/signal input-output port at one end and the flexible hose at the other end. The support frame connects with the two charging stands through a ball-in-socket joint adjacent to the power socket/signal input-output port. Each charging stand has a ball-in-socket joint attached to one side and each ball-in-socket joint is free to rotate relative to the charging stand. Furthermore, one ball-in-socket joint is attached to a linkage sheath while the other ball-in-socket joint is attached to one end of a linking rod having no linkage sheath.

The swivel-jointed voltage-stepping automobile charger of this invention may further include a plurality of wires running inside the flexible hose for connecting the transformer with the power socket/signal input-output port.

The swivel-jointed voltage-stepping automobile charger of this invention may further include a plurality of wires for connecting the transformer with the two power slots.

The swivel-jointed voltage-stepping automobile charger of this invention may further include a plurality of wire hooks for fastening to the flexible hose.

The swivel-jointed voltage-stepping automobile charger may further include a pair of clamping fixtures such as a pair of single-sided automatic ejection/latch-back clamps or a pair of double-sided automatic ejection/latch-back clamps each attached to one of the charging stands on the opposite side of the ball-in-socket joint. Alternatively, each clamping fixture includes a pair of clamping boards, a screw rod and a cap nut. Each clamping board has a through hole. One end of the screw rod has a T-shaped profile. The other end of the screw rod passes the through holes of the two clamping boards and joins up with the cap nut. The inner surface of each clamping board has an anti-slip layer such as a layer of polyurethane foam.

Furthermore, the external layer of the flexible hose of the swivel-jointed voltage-stepping automobile charger may be split open to hide additional wires and the color of the flexible hose may be changed by replacing the external layer.

The supporting frame of the swivel-jointed voltage-stepping automobile charger further includes a rod support base, a supporting rod, two linking rods and a linkage sheath. The rod, support base has a rectangular body fastened to the engaging bracket and adjacent to the power connection socket. The supporting rod has a cylindrical shape with one end perpendicularly attached to the rod support base and the other end having a spherical shape. The linking rods have a fine circular shape. One end of each linking rod is attached to the spherical end of the supporting rod and the linking rod is free to rotate relative to the supporting rod. The linkage sheath is a cylindrical tube with a fine internal bore that encloses the linking rod and permits the linking rod to slide inside the cylindrical tube in the rod's axial direction. In addition, the supporting frame, the two linking rods and the linkage sheath may also be fabricated using flexible hose so that they can be bent into different configurations and yet remain firm in the last position after the bending force is removed.

The connecting terminals of the power socket/signal input-output port in the swivel-jointed voltage-stepping automobile charger support connections to a G-Mouse antenna.

This invention also provides a third swivel-jointed voltage-stepping automobile (SVA) charger. The SVA charger comprises a flexible hose, a transformer, a power socket/signal input-output port, an engaging bracket and at least one charging stand. The flexible hose is a long piece of flexible tube that can be bent but remains firm when left on its own. The transformer has the capacity to transform an input voltage. One end of the transformer is a rectangular body connected to one end of the flexible hose. The other end of the transformer has a cylindrical body suitable for plugging into the cigarette lighter of an automobile. Through a bearing bending design at the rectangular end and the cylindrical end of the transformer, the two ends of the transformer are free to rotate or bend. The transformer further includes a switch for switching to a multiple of voltages. The power socket/signal input-output port has a columnar body with a plurality of connection terminals such as audio-visual connection terminals capable of linking with the signaling terminals of electronic products selectively. The engaging bracket joins up with the power socket/signal input-output port at one end and the flexible hose at the other end. The charging stand has a signal port. One side of this charging stand is fastened to the power socket/signal input/output port.

The swivel-jointed voltage-stepping automobile charger further includes two power slots. The two power slots have a rectangular body attached to the respective sides of the rectangular end of the transformer. Each power slot has a roughly circular internal groove.

The swivel-jointed voltage-stepping automobile charger of this invention may further include a plurality of wires running inside the flexible hose for connecting the transformer with the power socket/signal input-output port.

The swivel-jointed voltage-stepping automobile charger of this invention may further include a plurality of wires for connecting the transformer with the two power slots.

The swivel-jointed voltage-stepping automobile charger may further include a clamping fixture such as a single-sided automatic ejection/latch-back clamp or a double-sided automatic ejection/latch-back clamp attached to the charging stand on the same plane as the signaling port. Alternatively, each clamping fixture includes a pair of clamping boards, a screw rod and a cap nut. Each clamping board has a through hole. One end of the screw rod has a T-shaped profile. The other end of the screw rod passes the through holes of the two clamping boards and joins up with the cap nut. The inner surface of each clamping board has an anti-slip layer such as a layer of polyurethane foam.

The swivel-jointed voltage-stepping automobile charger may further include a supporting frame. The supporting frame includes a rod support base, a supporting rod, two linking rods and a linkage sheath. The rod support base has a rectangular body fastened to the engaging bracket and adjacent to the power connection socket. The supporting rod has a cylindrical shape with one end perpendicularly attached to the rod support base and the other end having a spherical shape. The linking rods have a fine circular shape. One end of each linking rod is attached to the spherical end of the supporting rod and the linking rod is free to rotate relative to the supporting rod. The linkage sheath is a cylindrical tube with a fine internal bore that encloses the Inking rod and permits the linking rod to slide inside the cylindrical tube in the rod's axial direction. In addition, the supporting frame, the two linking rods and the linkage sheath may also be fabricated using flexible hose so that they can be bent into different configurations and yet remain firm in the last position after the bending force is removed.

The connecting terminals of the power socket/signal input-output port in the swivel-jointed voltage-stepping automobile charger support connections to a G-Mouse antenna through a signaling port such as USB or RS232 so that satellite positioning signals can be transmitted to the PDA.

This invention provides a transformer that connects with a power socket/signal input-output port having a plurality of connection terminals and two charging stands both having signaling ports. Hence, the problem of having to charge one type of electronic product at a time using a conventional automobile charger is resolved.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

Reference Numbers and Corresponding Elements in the Drawings

Figure 1:
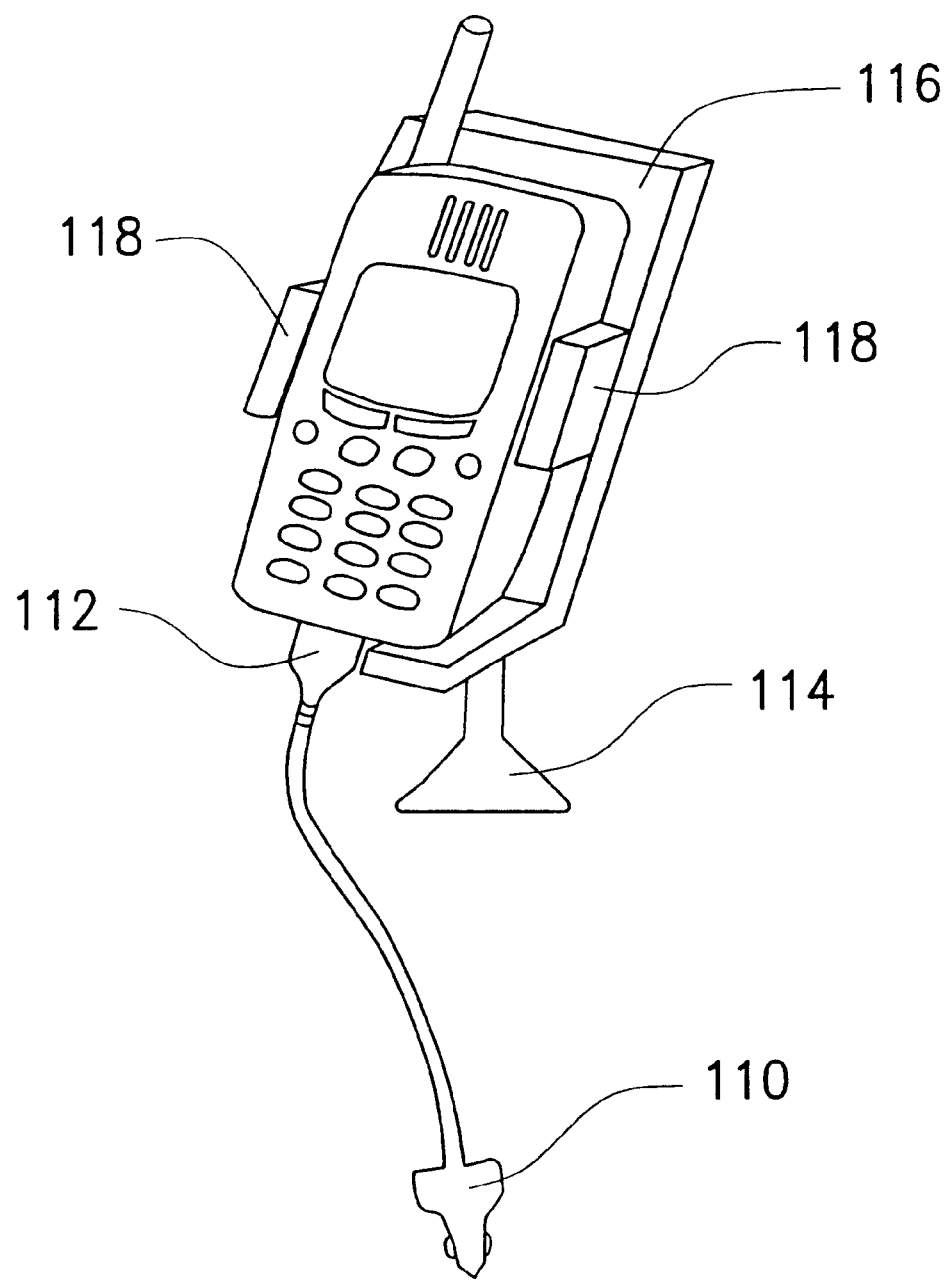
FIG. 1 is a perspective view of a conventional automobile charger.

110: a power plug
112: a signaling plug
114: a support stand
116: a backing board
118: clamps
210, 310: transformer
211, 311: switch
212, 314: flexible hose
214: an engaging bracket
216: a power socket/signal input/output port
217, 614: a connection terminal
218: a rod-supporting base
220: a PDA charging stand
222: a PDA signal port
224: a mobile phone charging stand
226: a mobile phone signaling port
228: a supporting rod
232, 236: linking rods
234, 240: a ball-in-socket joint
237: a spindle
238: linkage sheath
242: the G-Mouse antenna of a global positioning satellite (GPS) system
312: power slot
316: wire latche
410: automobile visor
510: wind shield
512: few clip
612: supporting rod

DESCRIPTION OF THE PREFERRED EMBODIMENTS

Reference will now be made in detail to the present preferred embodiments of the invention, examples of which are illustrated in the accompanying drawings. Wherever possible, the same reference numbers are used in the drawings and the description to refer to the same or like parts.

Figure 2:
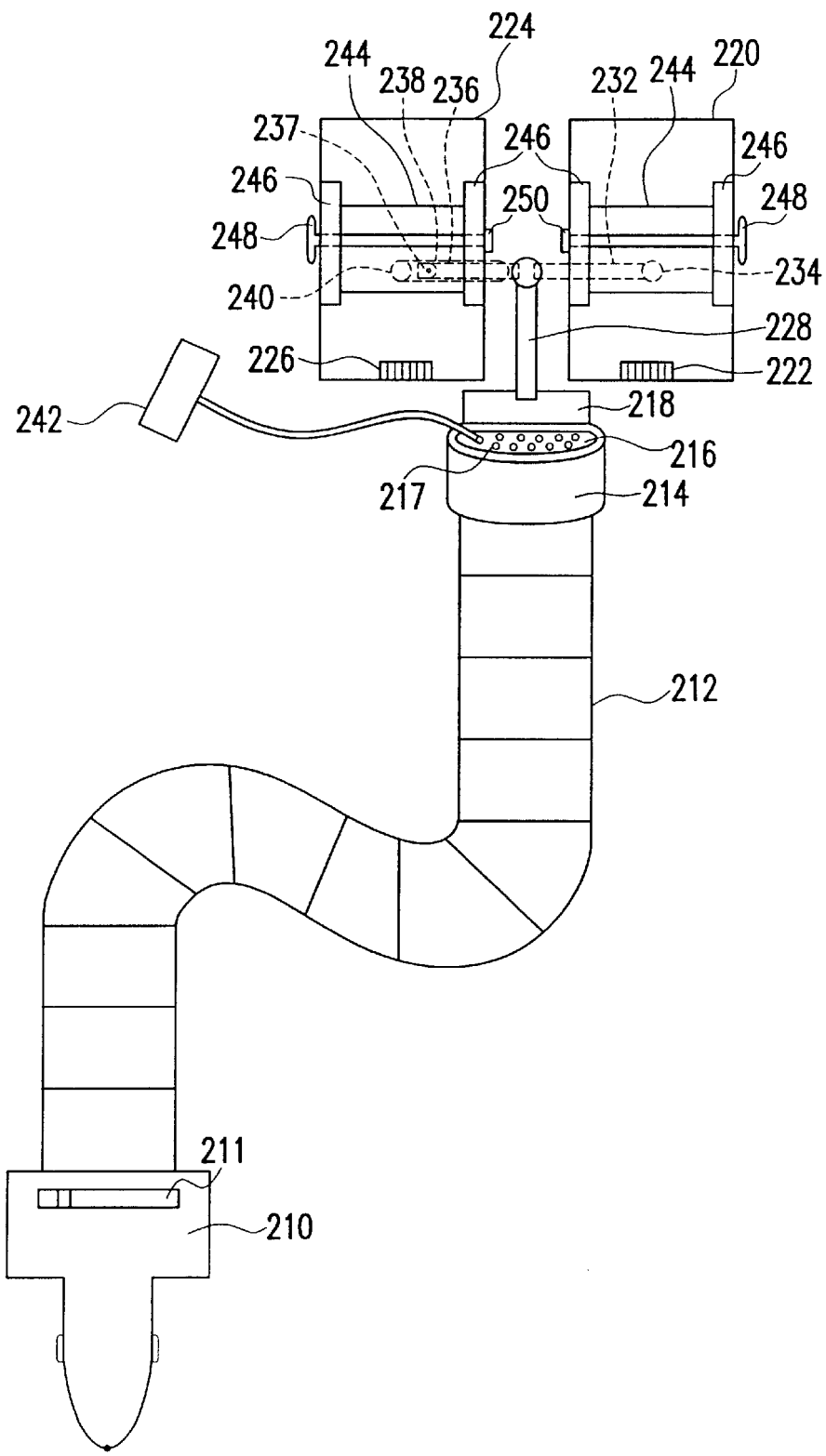
FIG. 2 is a sketch showing a swivel-jointed voltage-stepping automobile charger according to a first preferred embodiment of this invention.

FIG. 2 is a sketch showing a swivel-jointed voltage-stepping automobile charger according to a first preferred embodiment of this invention. As shown in FIG. 2, the swivel-jointed voltage-stepping automobile charger at least includes a flexible hose 212, a transformer 210, a power socket/signal input/output port 216, an engaging bracket 214, a rod-supporting base 218, a supporting rod 228, two linking rods 232 and 236, a linkage sheath, a PDA charging stand 220 and a mobile phone charging stand 224. The flexible hose 212 is a long piece of flexible tube that can be bent but remains firm after bending. The transformer 210 has voltage-stepping capability. One end of the transformer 210 is a rectangular body connected to one end of the flexible hose 212. The other end of the transformer 210 has a cylindrical body suitable for plugging into the cigarette lighter of an automobile. Through a bearing bending design at the rectangular end and the cylindrical end of the transformer 210, the two ends of the transformer 210 are free to rotate or bend. The transformer 210 further includes a switch for switching to a multiple of voltages. The power socket/ signal input-output port 216 has a semi-circular cylindrical shape with a plurality of connection terminals 217 such as audio-visual connection terminals capable of linking with the signaling terminals of electronic products selectively. The power socket/signal input-output port 216 is attached to one end of the flexible hose 212. A plurality of electric wires is enclosed inside the flexible hose 212 for connecting the transformer 210 with the power socket/signal input-output port 216. In addition, the G-Mouse antenna 242 of a global positioning satellite (GPS) system is connected to the power socket/signal input-output port 216 as well. The engaging bracket 214 joins up with the power socket/signal input-output port 216 and the flexible hose 212. The rod-supporting base 218 has a rectangular body fastened to the engaging bracket 214 next to the power socket/signal input-output port 216 using screws. The supporting rod 228 has a cylindrical body with one end attached to the rod-supporting base 218 perpendicularly and the other end having a spherical-shaped body. The linking rods 232 and 236 both have a fine cylindrical body. One end of the linking rods 232 and 236 join up with the spherical end of the supporting rod 228 in such a way that the linking rods 232 and 236 are free to rotate. The other end of the linking rod 236 is connected to a spindle 237. The linkage sheath 238 is a tube with a fine bore that encloses the spindle 237 and the linking rod 236. The linkage sheath 238 engages the spindle 237 of the linking rod 236 and permits the linking rod 236 to slide in the spindle direction. In the meantime, the linkage sheath 238 is also free to rotate relative to the linking rod 236 through the spindle 237.

The supporting rod 228, the two linking rods 232, 236 and the linkage sheath 238 may be fabricated using flexible hose material so that they can be bent to a desired location. The PDA charging stand 220 has a PDA signal port 222 such as a universal serial bus (USB) or an RS-232 port and a ball-in-socket joint 234. The ball-in-socket joint 234 is attached to front and back surfaces of the PDA charging stand 220. Through the connection of the ball-in-socket joint 234 on the PDA charging stand 220 with the linking rod 232, the PDA charging stand 220 is free to rotate. The mobile phone charging stand 224 has a mobile phone signaling port 226 and a ball-in-socket joint 240. The ball-in-socket joint 240 is attached to lo front and back surfaces of the mobile phone charging stand 224. Through the connection of the ball-in-socket joint 240 on the mobile phone charging stand 224 with the linking rod 236, the mobile phone charging stand 224 is free to rotate. Furthermore, the PDA charging stand 220 and the mobile phone charging stand 224 each has a clamping fixture such as a single-sided automatic ejection/ latch-back clamp or a double-sided automatic ejection/latch-back clamp. The clamping fixture is attached to the same plane as the signaling port 222 of the PDA and the signaling port 226 of the mobile phone. Alternatively, the clamping fixture includes a clamping base 244, two clamping boards 246, a screw rod 248 and a cap nut 250. The clamping base 244 is a rectangular board with a groove in the axial direction. The clamping base 244 is fastened to the charging stand 220 or 224. Each clamping board 246 has a through hole and a bump. Through the bump, each clamping board 246 joins perpendicularly with the clamping base 244. The interior surface of each clamping board 246 has an anti-slip layer such as a layer of polyurethane foam. One end of the screw rod 248 has a T-shaped cap. After passing the threaded end of the screw rod 248 through the hole of each clamping board 246, the cap nut 250 is screwed onto the threaded end to lock the screw rod 248 in position.

The transformer 210 is plugged into the cigarette lighter inside an automobile. The flexible hose 212 is then adjusted to a shape that suits a particular user. An individual PDA and mobile phone are placed on the PDA charging stand 220 and the mobile phone charging stand 224 respectively The PDA is connected to the signaling port 222 while the mobile phone is connected to the signaling port 226. By screwing the cap nut 250 on the screw rod 248, the two clamping boards 246 may be tightened to grip the PDA or the mobile phone. The charging stands 220 and 224 may be rotated into a suitable position for viewing through motion at the respective ball-in-socket joints 234 and 240.

Using the switch 211 provided by the transformer 210, the voltage obtained through the cigarette lighter port is transformed into a voltage suitable for operating various electronic products such as MP3, camcorder or portable TV. The connection terminals 217 of the power socket/signal input-output port 216 are connected to the circuits at the two signaling ports 222 and 226 via the rod-supporting base 218, the supporting rod 228, the linking rods 232, 236 and the linkage sheath 238. Ultimately, many types of electronic products are able to obtain power through the signaling ports 222 and 226.

If a user needs to receive an e-mail through the Internet, the linkage sheath 238 is first shifted to move the mobile phone charging stand 224 away from the supporting rod 228. Next, the linking rod 236 is rotated to move the mobile phone charging stand 224 away from the rod-supporting base 218. With additional rotation of the spindle 237, the mobile phone charging stand 224 approaches the PDA charging stand 220. After bringing the mobile phone and the PDA within a communication range, access to the Internet is possible by dialing up the mobile phone and transmitting data via the infrared device on the PDA.

On the other hand, if a user needs to access an electronic area map, the user may set up a data link with the PDA through the G-Mouse antenna 242 so that an instant position guide is immediately displayed on the electronic map.

Figure 3:
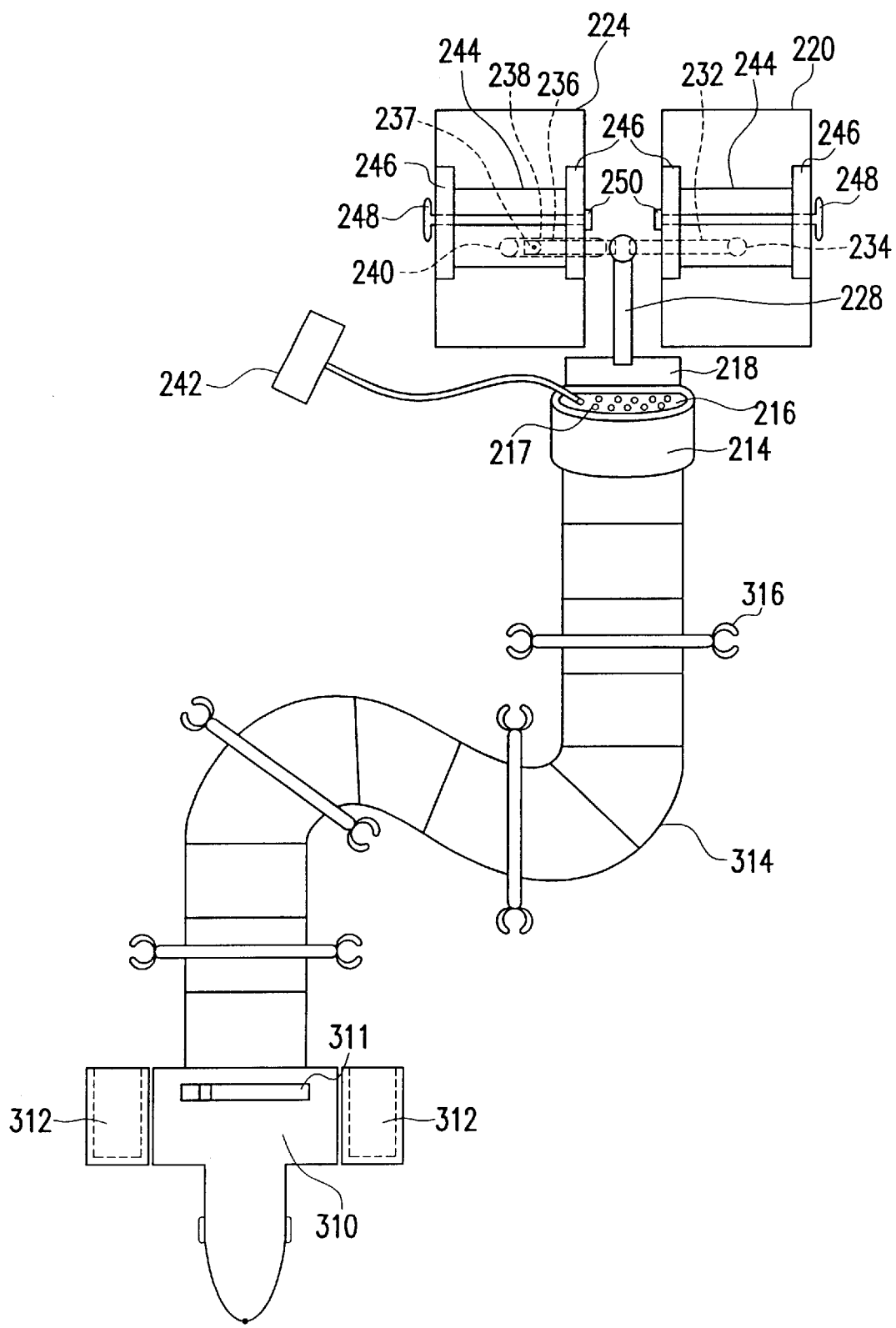
FIG. 3 is a sketch showing a swivel-jointed voltage-stepping automobile charger according to a second preferred embodiment of this invention.

In general, different types of automobile chargers are also available in the second-hand market. These automobile chargers may incorporate into the swivel-jointed voltage-stepping automobile charger according to this invention. FIG. 3 is a sketch showing a swivel-jointed voltage-stepping automobile charger according to a second preferred embodiment of this invention. As shown in FIG. 3, the swivel-jointed voltage-stepping automobile charger includes at least a flexible hose 314, a transformer 310, two power slots 312, a power socket/signal input/output port 216, an engaging bracket 214, a rod-supporting base 218, a supporting rod 228, two linking rods 232 and 236, a linkage sheath 238, a PDA charging stand 220 and a mobile phone charging stand 224. The flexible hose 314 is a long piece of cylindrical tube that can be bent but remains in shape after bending. The flexible hose may include a removable exterior wrapping. A plurality of wire latches is hooked onto the flexible hose 314. The transformer 310 has voltage-stepping capability. One end of the transformer 310 is a rectangular body connected to one end of the flexible hose 314. The other end of the transformer 310 has a cylindrical body suitable for plugging into the cigarette lighter of an automobile. Through a bearing bending design at the rectangular end and cylindrical end of the transformer 310, the two ends of the transformer 310 are free to rotate. The transformer 310 further includes a switch 311 for switching to a multiple of voltages. The two power slots 312 have a rectangular body each having a cylindrical groove. One power slot 312 is attached to each side of the transformer 310. A plurality of conductive wires connects the transformer 310 with the two power slots 312 so that the input voltage to the two power slots 312 and the transformer 310 are identical. The power socket/signal input-output port 216 has a semi-circular cylindrical shape with a plurality of connection terminals 217 such as audio-visual connection terminals capable of linking with the signaling terminals of electronic products selectively. The power socket/signal input-output port 216 is attached to one end of the flexible hose 314. A plurality of conductive wires runs inside the flexible hose 314 for connecting the transformer 310 with the power socket/signal input-output port 216. In addition, the G-Mouse antenna 242 of a global positioning satellite (GPS) system is connected to the power socket/signal input-output port 216 for receiving electronic signals. The engaging bracket 214 joins up with the power socket/signal input-output port 216 and the flexible hose 314. The rod-supporting base 218 has a rectangular body fastened to the engaging bracket 214 next to the power socket/signal input-output port 216 using screws. The supporting rod 228 has a cylindrical body with one end attached to the rod-supporting base 218 perpendicularly and the other end having a spherical-shaped body. The linking rods 232 and 236 both have a fine cylindrical body. One end of the linking rods 232 and 236 joins up with the spherical end of the supporting rod 228 in such a way that the linking rods 232 and 236 are free to rotate. The other end of the linking rod 236 is connected to a spindle 237. The linkage sheath 238 is a tube with a fine bore that encloses the spindle 237 and the linking rod 236. The linkage sheath 238 engages the spindle 237 and permits the linking rod 236 to slide in the spindle direction. In the meantime, the linkage sheath 238 is also free to rotate relative to the linking rod 236 through the spindle 237. The supporting rod 228, the two linking rods 232, 236 and the linkage sheath 238 may be fabricated using flexible hose material so that they can be bent to a desired location. The PDA charging stand 220 has a ball-in-socket joint 234. The ball-in-socket joint 234 is attached to one surface of the PDA charging stand 220. Through the connection of the ball-in-socket joint 234 on the PDA charging stand 220 with the linking rod 232, the PDA charging stand 220 is free to rotate. The mobile phone charging stand 224 has a ball-in-socket joint 240. The ball-in-socket joint 240 is attached to a surface of the mobile phone charging stand 224. Through the connection of the ball-in-socket joint 240 on the mobile phone charging stand 224 with the linking rod 236, the mobile phone charging stand 224 is free to rotate. Furthermore, the PDA charging stand 220 and the mobile phone charging stand 224 each has a clamping fixture such as a single-sided automatic ejection/latch-back clamp or a double-sided automatic ejection/latch-back clamp. The clamping fixture is attached to the opposite surface of the PDA ball-in-socket 234 or the opposite surface of the mobile phone ball-in-socket 240. Alternatively, the clamping fixture includes a clamping base 244, two clamping boards 246, a screw rod 248 and a cap nut 250. The clamping base 244 is a rectangular board attached to the charging stand 220 or the charging stand 224. The clamping base 244 has a groove in the axial direction. Each clamping board 246 has a through hole and a bump. Through the bump, each clamping board 246 joins perpendicularly with the clamping base 244. The interior surface of each clamping board 246 has an anti-slip layer such as a layer of polyurethane foam. One end of the screw rod 248 has a T-shaped cap. After passing the threaded end of the screw rod 248 through the hole of each clamping board 246, the cap nut 250 is screwed onto the threaded end to lock the screw rod 248 in position.

Aside from operating in a similar way as the one in FIG. 2, the swivel-jointed voltage-stepping automobile charger in FIG. 3 may utilize the two power slots 312 to integrate with an original automobile charger. Using a mobile phone and a PDA as an example, both can be charged at the same time. The mobile phone is placed on the charging stand 224 and fixed in position by the clamping fixture. An originally manufactured mobile phone power signal line is used to connect with the power slot 312. The power signal line runs along the flexible hose 314 and bounds to the hose 314 through a series of wire latches 316. The mobile phone is ready to operate when the other end of the power signal line is plugged into the power signal port of the mobile phone. Similarly, the PDA is placed on the PDA charging stand 220. An originally manufactured PDA power signal line is used to connect with the power slot 312. The power signal line runs along the flexible hose 314 and bounds to the hose 314 through a series of wire latches 316. The mobile phone is ready to operate when the other end of the power signal line is plugged into the power signal port of the PDA. On the other hand, if the PDA or the mobile phone does not need to be charged or does not have an originally manufactured power signal line for automobile charging, the PDA or mobile phone may still operate through a suitable power signal line connected to the power socket/signal input/output port 216.

Figure 4:
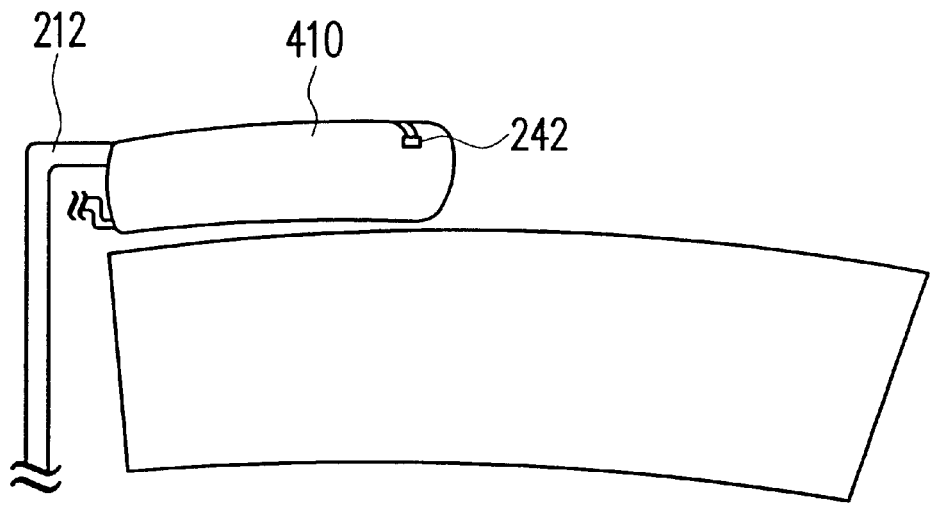
FIGS. 4 and 5 are sketches showing a local installation of a swivel-jointed voltage-stepping automobile charger according to a third preferred embodiment of this invention.
Figure 5:
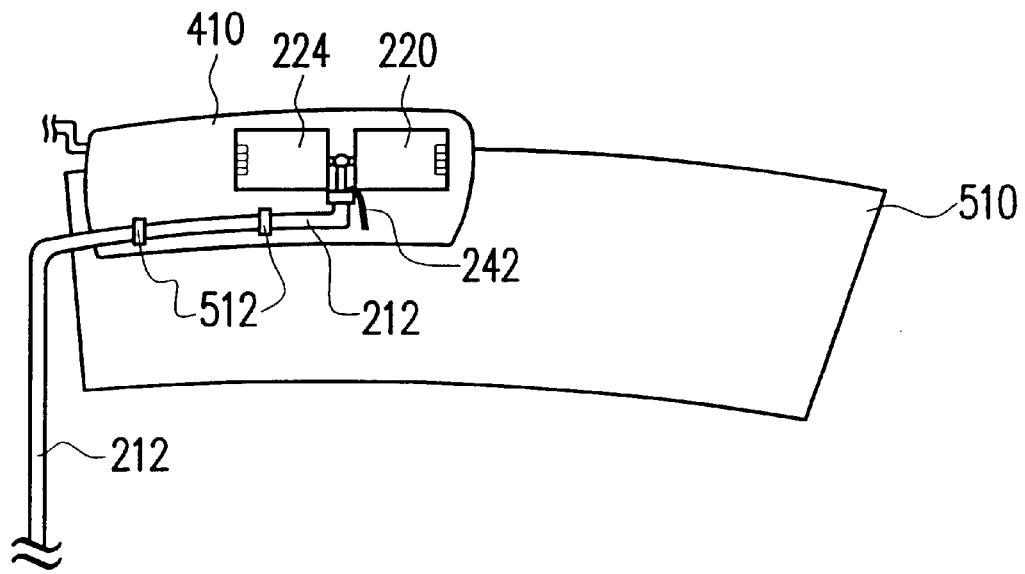

FIGS. 4 and 5 are, sketches showing a local installation of a swivel-jointed voltage-stepping automobile charger according to a third preferred embodiment of this invention. FIGS. 4 and 5 show an alternative installation to the one in FIG. 2 that has an identical operating method. Some automobiles have a power outlet and a lamp at the sun visor. As a driver turns over the sun visor, the lamp is lit. Hence, the swivel-jointed voltage-stepping automobile charger may be installed on the automobile visor 410 and connected to the power outlet. The flexible tube 212, the PDA charging stand 220, the mobile phone charging stand 224 and the support frame mounts on the sun visor 410 so that the G-mouse antenna 242 of the GPS may spread out on the front and back surface of the sun visor 410. The flexible hose 212 is fixed on the sun visor 410 through a few clips 512. Each clip 512 has an omega shape for sliding over the flexible tube 212. The clip 512 further includes a hole at each end for pinning to the sun visor 410.

When the sun visor 410 is flipped towards the wind shield 510, the GPS antenna 242 will face the wind shield 510 and the PDA charging stand 200 and the mobile phone charging stand 224 will face the driver, and in the meantime, the power source is also activated. Conversely, as the sun visor 410 is flipped away from the wind shield 510, the GPS antenna 242 will face the driver and the PDA charging stand 220 and the mobile phone charging stand 224 will be hidden behind the sun visor 410, and the power is also cut off.

Even if the sun visor 410 has no electrical power source, the flexible hose 212 may still plug into the cigarette lighter inside an automobile and uses flexible electric wire to channel power to the sun visor 410. Alternatively, the cigarette lighter is reconstituted on the sun visor 410.

As shown in FIG. 5, the PDA charging stand 220 and the mobile phone charging stand 224 may face each other directly so that the PDA is connected to the infrared device on the mobile phone for connecting to the Internet or providing audio-visual telephone function. Alternatively, the PDA charging stand 220 or the mobile phone charging stand 224 may be flipped over and pulled down through the ball-in-socket joints 234 or 240 so that the PDA or the mobile phone is closer to the driver for easier operation.

Figure 6:
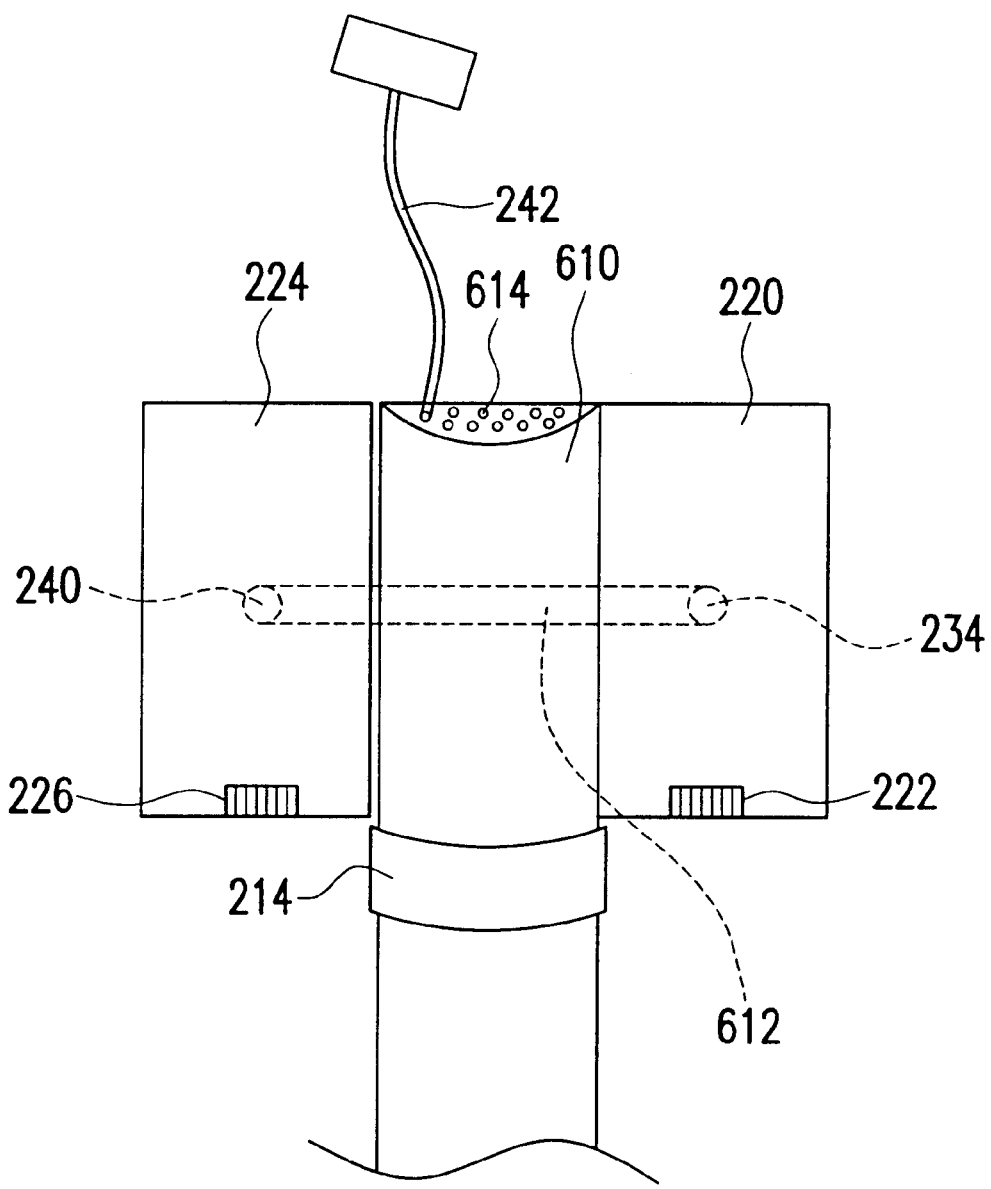
FIG. 6 is a sketch of an alternative supporting frame assembly for a swivel-jointed voltage-stepping automobile charger according to this invention.

The swivel-jointed voltage-stepping automobile charger in FIGS. 2, 3 and 5 has an identical supporting rod. However, the supporting rod can be different as shown in FIG. 6. FIG. 6 is a sketch of an alternative supporting frame assembly for a swivel-jointed voltage-stepping automobile charger according to this invention. The supporting rod 612 in FIG. 6 is a flexible tube that can be bent but remain firm after bending. The original power socket/signal input-output port 216 is modified into a power socket/signal input-output port 610 having a semicircular cylindrical shape so that the original rod-supporting base 218 and the supporting rods 228 are deleted. The PDA charging stand 220 is on one side attached to the power socket/signal input-output port 610. The power socket/signal input-output port 610 is connected to the flexible hose 212 or 314 through an engaging bracket 214. One end of the supporting rod 612 is connected to the ball-in-socket joint 234 on the PDA charging stand 220 while the other end of the supporting rod 612 is connected to the ball-in-socket joint 240 on the mobile phone charging stand 224. With the ball-in-socket joint 234 of the PDA charging stand 220 serving as a center, the mobile phone charging stand 224 at one end of the supporting rod 612 is free to rotate.

Following the recent trend of integrating electronic products into a unified product, this invention also provides yet another swivel-jointed voltage-stepping automobile charger. The design follows from the embodiments in FIGS. 2 and 6. First, the mobile phone charging stand 224 and the supporting rod 612 are dismantled. The swivel-jointed voltage-stepping automobile charger includes a flexible hose 610, an engaging bracket 214 and a PDA charging stand 220. The flexible hose 212 is a long piece of cylindrical tube that can be bent into different shapes but remain firm after bending. The transformer 210 has voltage-stepping capability. One end of the transformer 210 is a rectangular body connected to one end of the flexible hose 212. The other end of the transformer 210 has a cylindrical body suitable for plugging into the cigarette lighter of an automobile. Through a bearing bending design at the rectangular end and the cylindrical end of the transformer 210, the two ends of the transformer 210 are free to rotate. The transformer 210 further includes a switch 211 for switching to a multiple of voltages. The power socket/signal input-output port 610 has a cylindrical shape with a plurality of connection terminals 614 such as audio-visual connection terminals capable of linking with the signaling terminals of electronic products selectively. The power socket/signal input-output port 610 is attached to one end of the flexible hose 212. A plurality of conductive wires runs inside the flexible hose 212 for connecting the transformer 210 with the power socket/signal input-output port 610. In addition, the G-Mouse antenna 242 of a global positioning satellite (GPS) system is connected to the power socket/signal input-output port 610 for receiving electronic signals. The engaging bracket 214 joins up with the power socket/signal input-output port 610 and the flexible hose 212. The PDA charging stand 220 has a rectangular shape with a signaling port 222 such as a universal serial bus (USB) port or an RS-232 port. One side of the PDA charging stand 220 is attached to the power socket/signal input-output port 610. Each side of the PDA charging stand has an arc-shaped bump and forms two grooves with the surface of the PDA charging stand having the signaling port thereon for laying the PDA. Furthermore, the PDA charging stand 220 has a clamping fixture such as a single-sided automatic ejection/latch-back clamp or a double-sided automatic ejection/latch-back clamp. The clamping fixture is attached to the same surface containing the PDA signaling port 222. Alternatively, the clamping fixture includes a clamping base 244, two clamping boards 246, a screw rod 248 and a cap nut 250. The clamping base 244 is a rectangular board attached to the charging stand 220 or the charging stand 224. The clamping base 244 has a groove in the axial direction. Each clamping board 246 has a through hole and a bump. Through the bump, each clamping board 246 joins perpendicularly with the clamping base 244. The interior surface of each clamping board 246 has an anti-slip layer such as a layer of polyurethane foam. One end of the screw rod 248 has a T-shaped cap. After passing the threaded end of the screw rod 248 through the hole of each clamping board 246, the cap nut 250 is screwed onto the threaded end to lock the screw rod 248 in position.

Similar in function to the charger in FIG. 2, voltage from the cigarette lighter of an automobile is transformed to a voltage suitable for operating various types of electronic products such as an MP3 player, camcorder, or portable TV, by moving the switch 211 provided by the transformer 210. The connection terminals 614 of the power socket/signal input-output port 610 are connected to the circuits at the signaling port 222. Consequently, many types of electronic products are able to connect with each other.

If a user needs to access an electronic area map, the user may set up a data link with the PDA through the G-Mouse antenna 242 so that an instant position guide is immediately displayed on the electronic map.

According to the aforementioned embodiments, major aspects of this invention are the use of a flexible hose that can be bent into different shapes, a transformer with voltage-stepping function, a plurality of connection terminals on a power socket, a signaling port on each charging stand, a supporting rod, linking rods, a spindle and a linkage sheath. Hence, two types of portable electronic products can be charged at the same time.

In conclusion, the swivel-jointed voltage-stepping automobile charger of this invention has at least the following advantages:

1. Using a transformer, a power socket/signal input-output port and the signaling ports on a pair of charging stands, two different types of portable electronic products including a mobile phone and a PDA may be charged concurrently and connected to each other. Hence, this invention eliminates the restriction of having to charge one type of electronic product at a time and provides a means of transmitting or signaling between different electronic products.
2. Through a flexible tube that can be bent into different shapes and a supporting frame design, the charger can be brought close to the user and adjusted to whatever angle and distance is suitable for audio-visual operation.
3. Through the special design of the supporting frame, the linking rods, the linkage sheath and the spindle design, the linkage sheath is able to slide linearly, and the spindle and the linking rods are able to rotate. Moreover, the mobile phone and the PDA on the respective charging stands may be connected to perform various types of electronic, intelligent and information processing functions such as linking up with the Internet for sending or receiving e-mails, audio-visual telephoning and guiding/monitoring. All the while, the mobile phone and the PDA can be charged concurrently.
4. Voltage from the cigarette lighter inside an automobile is transformed by the transformer into voltages suitable for operating various types of electronic products. Thereafter, the voltages are distributed to various electronic products via the plurality of connection terminals on the power socket/signal input-output port so that many types of electronic products are powered.

5. The swivel-jointed voltage-stepping automobile charger may also be installed on the sun visor inside an automobile. When the sun visor is flipped away from the wind shield, the charging connector and the data electronic products are hidden behind the sun visor.

6. By using two power slots and wire latches or a flexible tube with removable exterior rapping, the swivel-jointed voltage-stepping automobile charger of this invention may integrate with other originally manufactured automobile chargers without interfering with the original system. Moreover, the conductive wires are hidden inside the flexible tube.

7. By installing the charger on the sun visor and utilizing the supporting frame design and the ball-in-socket joints, the charging stand of the swivel-jointed voltage-stepping automobile charger is easily pulled down and brought close to a user for better manipulation.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A swivel-jointed voltage-stepping automobile charger, comprising:
    a flexible hose having a long tubular structure, wherein the flexible hose can be bent into a variety of fixed final configurations;
    a transformer having a voltage-stepping capability, wherein one end of the transformer has a rectangular body for connecting with one end of the flexible hose and the other end of the transformer has a cylindrical body for inserting into the cigarette lighter of an automobile;
    a power socket/signal input-output port having a semi-circular cylindrical body with a plurality of connection terminals therein, wherein the power socket/signal input-output port is connected to the other end of the flexible hose;
    an engaging bracket joining with the power source/signal input-output port and the flexible hose;
    at least one charging stand :having a substantial rectangular structure, the charging stand having a signaling port on a surface of the charging stand, wherein the charging stand having a ball-in-socket joint positioned on the front and back surface of the respective charging stand, and the ball-in-socket joints permit the charging stand to rotate freely; and
    a supporting frame connected to the ball-in-socket joint of the two charging stands and adjacent to the power socket/signal input-output port.

2. The charger of claim 1, wherein the charger may further include a plurality of electric wires inside the flexible hose for connecting the transformer with the power socket/signal input-output port.

3. The charger of claim 1, wherein the rectangular body and the cylindrical body on each end of the transformer has a bearing bending design so that the two ends of the transformer are free to rotate or bend.

4. The charger of claim 1, wherein the supporting frame further includes:
    a rod-supporting base having a rectangular body, wherein the rod-supporting base is attached to the engaging bracket adjacent to the power socket/signal input-output port;
    a supporting rod having a cylindrical body, wherein one end of the supporting rod is attached perpendicularly to, the rod-supporting base and the other end of the supporting rod has a spherical shaped blob;
    at least one linking rod having a fine cylindrical body, wherein one end of the linking rod is connected to the spherical shaped blob at the end of the supporting rod and the linking rod is free to rotate relative to the supporting rod, and the linking rod is connected to the ball-in-socket joint of one of the charging stands; and
    a linkage sheath having a fine internal bore for sliding over the linking rod, wherein the linkage sheath not only encloses the linking rod, but is also free to slide linearly along the axis of the linking rod, and the linkage sheath also connects with the ball-in-socket joint of the charging stands.

5. The charger of claim 4, wherein the charger may further include a spindle for connecting with the linking rod and for sliding into the linkage sheath such that the linkage sheath is able to move along the axis of the linking rod and enclose the spindle and the linking rod.

6. The charger of claim 1, wherein the supporting frame may include a flexible hose for bending the frame into a variety of final configurations, the flexible hose connecting the ball-in-socket joint of the charging stand.

7. The charger of claim 1, wherein the charger may further include a clamping fixture installed in the charging stand on the same side as the signaling port.

8. The charger of claim 7, wherein the clamping fixture includes:
    a clamping base shaped like a rectangular board, wherein the clamping base is fastened to the charging stand and that the clamping base has a groove in the axial direction;
    a pair of clamping boards each having a through hole and a bump, wherein each of the clamping board is perpendicularly attached to the clamping base through the bump and the interior surface of each clamping board has an anti-slip layer such as a layer of polyurethane foam;
    a screw rod having a T-shaped profile at one end, wherein the other end of the screw rod passes through the hole in the clamping board; and
    a cap nut that engages with the screw rod after the screw rod has passed through the two clamping boards.

9. The charger of claim 7, wherein the clamping fixture is a single-sided automatic ejection/latch-back clamp.

10. The charger of claim 1, wherein the connection terminals on the power socket/signal input-output port may connect with a global satellite positioning antenna.

11. The charger of claim 1, wherein the connection terminals of the power socket/signal input-output port includes an audio-visual connection terminal.

12. The charger of claim 1, wherein the transformer may further include a switch for setting the voltage level.

13. The charger of claim 1, wherein the signaling port includes a universal serial bus (USB), a RS-232 port, or a signaling port of various mobile communication units.

14. The charger of claim 1, wherein the charger may further include a plurality of electric wires inside the flexible hose for connecting the transformer with the power socket/signal input-output port.

15. The charger of claim 1, further comprising
    a plurality of fastening clips having an omega shape that slides into the flexible hose, wherein the two ends of each clip have a hole for pinning to the sun visor.

* * * * *